(12) United States Patent
Yoon

(10) Patent No.: US 11,597,379 B2
(45) Date of Patent: Mar. 7, 2023

(54) INTEGRATED CHASSIS CONTROL SYSTEM

(71) Applicants: HYUNDAI MOTOR COMPANY, Seoul (KR); KIA MOTORS CORPORATION, Seoul (KR)

(72) Inventor: Young Sik Yoon, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 141 days.

(21) Appl. No.: 17/003,590

(22) Filed: Aug. 26, 2020

(65) Prior Publication Data
US 2021/0094533 A1    Apr. 1, 2021

(30) Foreign Application Priority Data
Sep. 27, 2019    (KR) .................. 10-2019-0119255

(51) Int. Cl.
*B60W 30/02*    (2012.01)
*B60W 50/04*    (2006.01)
(Continued)

(52) U.S. Cl.
CPC ............ *B60W 30/02* (2013.01); *B60W 10/20* (2013.01); *B60W 10/22* (2013.01); *B60W 40/06* (2013.01);
(Continued)

(58) Field of Classification Search
CPC ...... B60W 30/02; B60W 10/20; B60W 10/22; B60W 40/06; B60W 40/109; B60W 40/114; B60W 40/12; B60W 50/04; B60W 2552/53; B60W 2555/20; B60W 2554/404; B60W 2554/80; B60W 2420/42; B60W 2420/52; B60W 2510/20; B60W 2520/125; B60W 2520/14; B60W 2520/28

See application file for complete search history.

(56) References Cited

U.S. PATENT DOCUMENTS

2011/0112722 A1* 5/2011 Kalkkuhl ............ B60T 8/1755
                                                                 701/41
2014/0005892 A1    1/2014 Bar et al.
(Continued)

FOREIGN PATENT DOCUMENTS

CN    106573623 A    * 4/2017 ............ B60W 30/18
JP    2019038394 A   * 3/2019

*Primary Examiner* — Maceeh Anwari
*Assistant Examiner* — Charles Pall
(74) *Attorney, Agent, or Firm* — Morgan, Lewis & Bockius LLP

(57) ABSTRACT

An integrated chassis control system includes a first sensor configured to sense a first vehicle driving in a lane adjacent to a lane in which an own vehicle is driving and to sense behavior information of the first vehicle, a second sensor configured to sense a variation in behavior of the own vehicle, a first determinator configured to determine a degree of influence of a side wind, which is predicted to occur due to the first vehicle, based on the behavior information of the first vehicle, a second determinator configured to determine a variance in abnormal behavior of the own vehicle based on information sensed by the second sensor, a first controller configured to perform a semi-active chassis system control, and a second controller configured to perform an active chassis system control.

12 Claims, 4 Drawing Sheets

| STEP-BY-STEP CONTROL STRATEGY FOR INFLUENCE OF SIDE WIND | | | | | |
|---|---|---|---|---|---|
| INFLUENCE OF SIDE WIND | CONTROL METHOD | DETAILS OF INTERVENTION SYSTEM | | | |
| | | MDPS | ECS | RWS | ESC (PARTIAL BRAKING) |
| Low | PREEMPTIVE CONTROL Only | Sport | Hard | - | - |
| Middle | PREEMPTIVE CONTROL + FEEDBACK CONTROL | Sport | Hard | ○ | - |
| High | | Sport | Hard | ○ | ○ |

(51) Int. Cl.
| | |
|---|---|
| *B60W 40/114* | (2012.01) |
| *B60W 40/109* | (2012.01) |
| *B60W 40/12* | (2012.01) |
| *B60W 10/20* | (2006.01) |
| *B60W 10/22* | (2006.01) |
| *B60W 40/06* | (2012.01) |

(52) U.S. Cl.
CPC ........ *B60W 40/109* (2013.01); *B60W 40/114* (2013.01); *B60W 40/12* (2013.01); *B60W 50/04* (2013.01); *B60W 2420/42* (2013.01); *B60W 2420/52* (2013.01); *B60W 2510/20* (2013.01); *B60W 2520/125* (2013.01); *B60W 2520/14* (2013.01); *B60W 2520/28* (2013.01); *B60W 2552/53* (2020.02); *B60W 2554/404* (2020.02); *B60W 2554/80* (2020.02); *B60W 2555/20* (2020.02)

(56) References Cited

U.S. PATENT DOCUMENTS

2018/0037259 A1* 2/2018 Hawes .................. G01C 19/44
2018/0356835 A1* 12/2018 Gehring ............... G05D 1/0293

* cited by examiner

FIG. 2
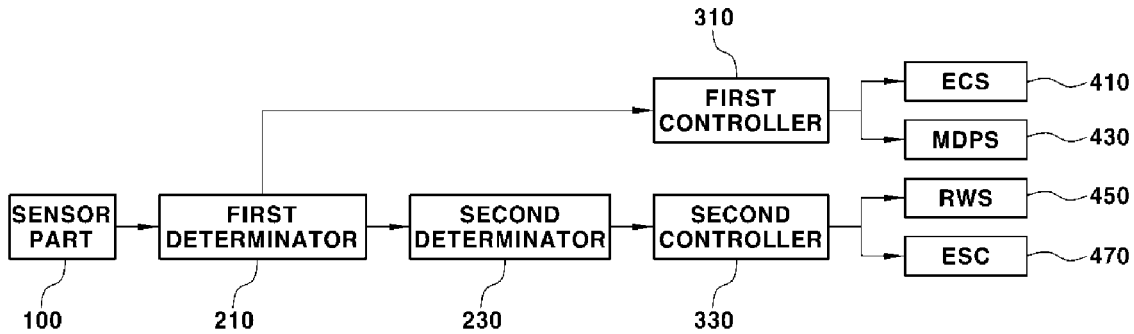
FIG. 3
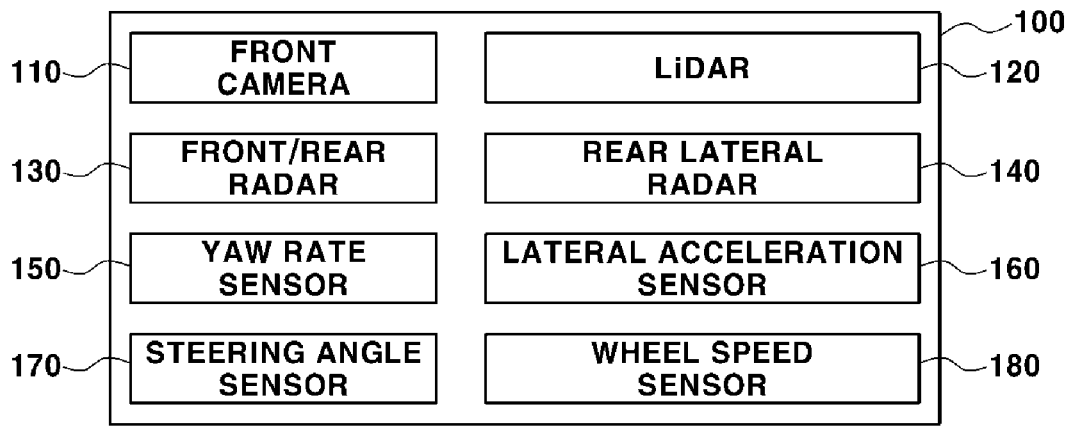
FIG. 4
| STEP-BY-STEP CONTROL STRATEGY FOR INFLUENCE OF SIDE WIND ||||||
|---|---|---|---|---|---|
| INFLUENCE OF SIDE WIND | CONTROL METHOD | DETAILS OF INTERVENTION SYSTEM ||||
| | | MDPS | ECS | RWS | ESC (PARTIAL BRAKING) |
| Low | PREEMPTIVE CONTROL Only | Sport | Hard | - | - |
| Middle | PREEMPTIVE CONTROL + FEEDBACK CONTROL | Sport | Hard | ○ | - |
| High | | Sport | Hard | ○ | ○ |

INTEGRATED CHASSIS CONTROL SYSTEM

CROSS-REFERENCE TO RELATED APPLICATION

The present application claims the benefit of priority to Korean Patent Application No. 10-2019-0119255, filed on Sep. 27, 2019 in the in the Korean Intellectual Property Office (KIPO), the entire contents of which are incorporated herein by reference.

TECHNICAL FIELD

The present disclosure relates to an integrated chassis control system for controlling an own vehicle in consideration of influence of a side wind which occurs due to surrounding vehicles.

BACKGROUND

A side wind is generated by a natural side wind or high-speed driving of large vehicles. When the side wind is severe, a driving direction of a vehicle may be changed regardless of a driver's intention of a driver, and the vehicle leaves a lane in which the vehicle is driving due to a change of the driving direction of the vehicle so that a vehicle accident may occur.

Generally, as a method of compensating for a vehicle behavior change caused by a side wind, a technique using a motor-driven power steering (MDPS) system and active and semi-active suspension systems (electronic controlled suspension (ECS) system) is applied. However, when a degree of influence of the side wind is large to the extent to which a driving direction of the vehicle is changed, there is a problem in that a behavior of an own vehicle is not stabilized by only control of the MDPS system and the active and semi-active suspension systems.

The information disclosed in the Background section above is to aid in the understanding of the background of the present disclosure, and should not be taken as acknowledgement that this information forms any part of prior art.

SUMMARY

The present disclosure has been made in an effort to solve the above-described problems associated with prior art.

In one aspect, the present disclosure provides an integrated chassis control system for stabilizing a behavior of an own vehicle in consideration of an effect of a side wind.

In another aspect, the present disclosure provides an integrated chassis control system for controlling a driving mode, steering, and braking of a vehicle so as to stabilize a behavior of an own vehicle based on a degree of influence of a side wind and an occurrence degree of an abnormal behavior of the vehicle.

In a preferred embodiment, an integrated chassis control system includes a first sensor configured to sense a first vehicle driving in a lane adjacent to a lane in which an own vehicle is driving and to sense behavior information of the first vehicle, a second sensor configured to sense a variation in behavior of the own vehicle, a first determinator configured to determine a degree of influence of a side wind, which is predicted to occur due to the first vehicle, based on the behavior information of the first vehicle, a second determinator configured to determine a variance in abnormal behavior of the own vehicle based on information sensed by the second sensor, a first controller configured to perform a semi-active chassis system control when the degree of influence of the side wind, which is predicted by the first determinator, is greater than or equal to a predetermined setting value, and a second controller configured to perform an active chassis system control by calculating a control value for stabilizing the behavior of the own vehicle according to the variance in abnormal behavior of the own vehicle, which is determined by the second determinator.

According to one example, the first sensor may include at least one of a front camera, a front/rear radio detection and ranging (RADAR), a rear lateral RADAR, or a light detecting and ranging (LiDAR).

According to one example, the first determinator may determine a size of the first vehicle, a distance between the own vehicle and the first vehicle, and a relative speed of the first vehicle to the own vehicle through the first sensor.

According to one example, the first determinator may quantify the degree of influence of the side wind based on the size of the first vehicle, the distance between the own vehicle and the first vehicle, and the relative speed of the first vehicle to the own vehicle, and the degree of influence of the side wind may be calculated as follows:

$$\text{Degree of influence of side wind} = \frac{|\text{relative speed of other vehicle}|^2 \times \text{size of other vehicle}}{\text{distance between own vehicle and other vehicle}}.$$

According to one example, the second sensor may include at least one of the front camera, a yaw rate sensor, a lateral acceleration sensor, a steering angle sensor, or a wheel speed sensor.

According to one example, the second determinator may predict a target yaw rate value of the own vehicle based on information sensed by a steering angle sensor and a wheel speed sensor and compare an actual yaw rate value, which is measured by a yaw rate sensor, with the target yaw rate value to determine the variance in abnormal behavior of the own vehicle.

According to one example, the second determinator may determine a driver's intention of steering based on information sensed by the steering angle sensor, determine the variation in behavior of the own vehicle in a lateral direction based on information sensed by at least one of a front camera, a yaw rate sensor, or a lateral acceleration sensor, and determine the variance in abnormal behavior of the own vehicle.

According to one example, when a steering angular velocity value, which is sensed by the steering angle sensor, is less than or equal to a reference value, the second determinator may determine that no driver's intention of steering is present, and, when the steering angular velocity value is less than or equal to the reference value and the variation in behavior of the own vehicle in the lateral direction is present, the second determinator may determine that the behavior of the own vehicle is abnormal.

According to one example, the semi-active chassis system control may include control of at least one of a motor-driven power steering (MDPS) system or a semi-active suspension system (electronic controlled suspension (ECS) system) of the own vehicle.

According to one example, the MDPS system may adjust a steering wheel of the own vehicle to be heavier than normal(a sport mode), and the ECS system may adjust a damping force of a suspension to be larger than normal.

According to one example, the active chassis system control may include control of at least one of a rear wheel steering (RWS) system and an electronic stability control (ESC) system of the own vehicle.

According to one example, when the second controller performs control of stabilizing the behavior of the own vehicle, the second controller may firstly perform the control according to the RWS system, and, when generation of a lateral force is additionally required so as to stabilize the behavior of the own vehicle, the second controller may additionally control the ESC system.

According to one example, in order to implement the control value, the second determinator may calculate ranges of a limit braking force of each wheel and a producible lateral force of the own vehicle, and when the control value is implementable by generating a lateral force through the RWS system, the second controller may control only the RWS system, and when the control value is not implementable by generating the lateral force through the RWS system, the second controller may control both of the RWS system and the ESC system.

According to one example, the first determinator may predict an occurrence time of the side wind based on a distance between the own vehicle and the first vehicle and a relative speed of the first vehicle to the own vehicle.

According to one example, the first controller may preferentially perform the semi-active chassis system control over the active chassis system control, and the second controller may perform the active chassis system control based on the predicted occurrence time of the side wind.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein:

FIG. 2 is a block diagram illustrating an integrated chassis control system according to an exemplary embodiment of the present disclosure;

FIG. 3 is a block diagram illustrating a sensor part according to an exemplary embodiment of the present disclosure;

FIG. 4 is a diagram showing a control strategy of an own vehicle according to a degree of influence of a side wind according to an exemplary embodiment of the present disclosure;

Figure 1:
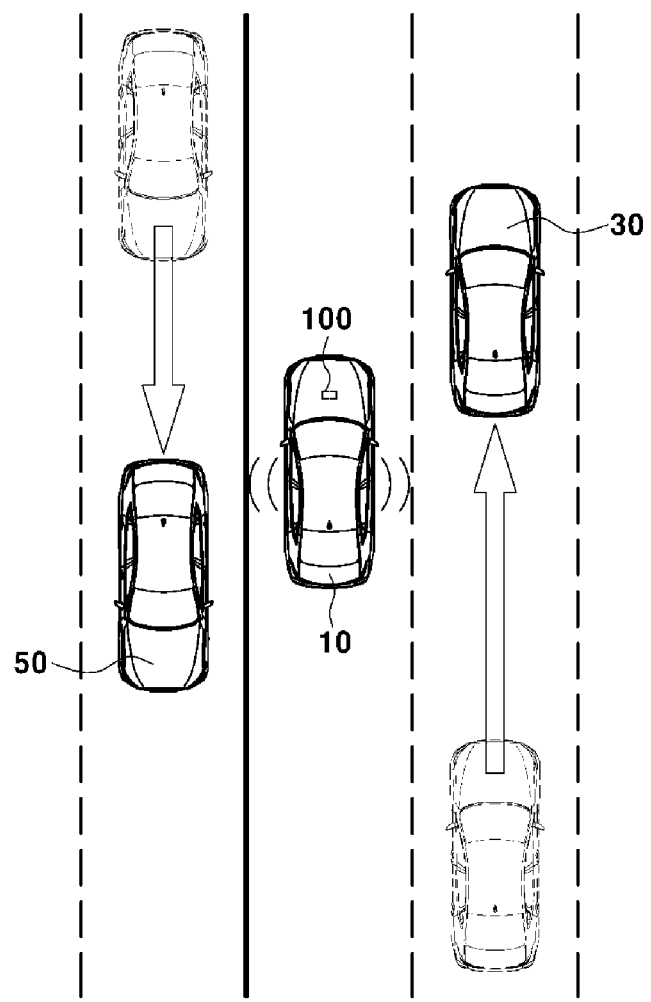
FIG. 1 is a diagram for describing occurrence of a side wind by a surrounding vehicle according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The advantages and features of the present disclosure and a manner for achieving them will become apparent with reference to the embodiments described in detail below together with the accompanying drawings. The present disclosure may, however, be implemented in many different forms and should not be construed as being limited to the embodiments set forth herein, and the embodiments are provided such that this disclosure will be thorough and complete and will fully convey the scope of the present disclosure to those skilled in the art, and the present disclosure is defined by only the scope of the appended claims. The same reference numerals refer to the same components throughout this disclosure.

The terms "~part," "~unit," "~module," and the like used herein mean a unit for processing at least one function or operation, and this unit may be implemented by hardware, software, or a combination of hardware and software.

Further, in this disclosure, the terms a first, a second, and the like are assigned to components so as to discriminate these components because names of the components are the same, but these terms are not necessarily limited to the order in the following description.

The following detailed description illustrates the present disclosure. Further, the foregoing is intended to illustrate and describe the exemplary embodiments of the present disclosure, and the present disclosure may be used in various other combinations, modifications, and environments. That is, it is possible to make alternations or modifications without departing from the scope of the present disclosure disclosed in this disclosure, equivalents, and/or within the technical or knowledge scope in the art to which the present disclosure pertains. The described embodiments are intended to illustrate the best mode for carrying out the technical spirit of the present disclosure and various modification can be made in the specific applications and uses of the present disclosure. Therefore, the detailed description is not intended to limit the present disclosure as in the disclosed embodiments. Further, it should be construed that the appended claims are intended to include another embodiment.

FIG. 1 is a diagram for describing occurrence of a side wind by a surrounding vehicle according to an exemplary embodiment of the present disclosure.

Referring to FIG. 1, a side wind may be generated by surrounding vehicles 30 and 50 which are driving in lanes adjacent to a lane in which an own vehicle 10 is driving. The surrounding vehicles 30 and 50 may include a first vehicle 30 which is a vehicle driving in the same direction as the own vehicle 10 and a second vehicle 50 which is a vehicle driving in a direction opposite a direction in which the own vehicle 10 is driving. In this case, any one of the first vehicle 30 and the second vehicle 50 may drive at a speed that is faster than that of the own vehicle 10 to pass the own vehicle 10.

A sensor part 100 may be disposed in the own vehicle 10 to detect the own vehicle 10 and the surrounding vehicles 30 and 50. The sensor part 100 may detect a behavior state of the own vehicle 10 and detect that the surrounding vehicles 30 and 50 approach the own vehicle 10. The sensor part 100 may detect the first vehicle 30 approaching a rear side of the own vehicle 10 and the second vehicle 50 approaching a front side of the own vehicle 10. An integrated chassis control system according to an exemplary embodiment of the present disclosure may control the own vehicle 10 based on information detected by the sensor part 100 to achieve stabilization of a behavior of the own vehicle 10.

FIG. 2 is a block diagram illustrating the integrated chassis control system according to an exemplary embodiment of the present disclosure, and FIG. 3 is a block diagram illustrating the sensor part 100 according to an exemplary embodiment of the present disclosure.

Referring to FIGS. 1 to 3, an integrated chassis control system 1 may include the sensor part 100, a first determinator 210, a second determinator 230, a first controller 310, a second controller 330, and a plurality of vehicle control systems 410, 430, 450, and 470. In this case, the first determinator 210 and the second determinator 230 may be configurations of the first controller 310 or the second controller 330. The first determinator 210, the second determinator 230, the first controller 310, and the second controller 330 may be configurations which are divided based on functions for implementing the integrated chassis control system 1.

The first and second determinators 210 and 230 and the first and second controllers 310 and 330 of the integrated chassis control system 1 according to an exemplary embodiment of the present disclosure each may be a processor (e.g., computer, microprocessor, CPU, ASIC, circuitry, logic circuits, etc.). Each of the first and second determinators 210 and 230 and the first and second controllers 310 and 330 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). According to another aspect of the present disclosure, the first and second determinators 210 and 230 and the first and second controllers 310 and 330 may be implemented as a single processor having an associated non-transitory memory.

The sensor part 100 may include a first sensor for sensing the surrounding vehicles 30 and 50 which are driving in lanes adjacent to the own vehicle 10 and a second sensor for sensing a variation in behavior of the own vehicle 10. The sensor part 100 may include a front camera 110, a light detecting and ranging (LiDAR) 120, a front/rear radio detection and ranging (RADAR) 130, a rear lateral RADAR 140, a yaw rate sensor 150, a lateral acceleration sensor 160, a steering angle sensor 170, and a wheel speed sensor 180. For example, the first sensor may include at least one of the front camera 110, the LiDAR 120, the front/rear RADAR 130, or the rear lateral RADAR 140, and the second sensor may include at least one of the front camera 110, the yaw rate sensor 150, the lateral acceleration sensor 160, the steering angle sensor 170, or the wheel speed sensor 180.

The front camera 110 may sense a lane in which the own vehicle 10 is driving. Whether the own vehicle 10 leaves the lane and whether a variation in lateral behavior of the own vehicle 10 occurs within the lane may be sensed through the front camera 110. Further, the front camera 110 may sense the second vehicle 50 which approaches the own vehicle 10. The front camera 110 may sense a size of the second vehicle 50, a distance between the own vehicle 10 and the second vehicle 50, and a relative speed of the second vehicle 50 to the own vehicle 10.

The LiDAR 120 may a device which draws a surrounding figure by emitting laser light and receive the light reflected and returned from a surrounding object to measure a distance to the surrounding object. The LiDAR 120 may sense the size of the second vehicle 50, the distance between the own vehicle 10 and the second vehicle 50, and the relative speed of the second vehicle 50 to the own vehicle 10.

The front/rear RADAR 130 and the rear lateral RADAR 140 may sense the surrounding vehicles 30 and 50 which are approach the own vehicle 10. The front/rear RADAR 130 and the rear lateral RADAR 140 may sense sizes of the surrounding vehicles 30 and 50, distances between the own vehicle 10 and the surrounding vehicles 30 and 50, and relative speeds of the surrounding vehicles 30 and 50 to the own vehicle 10.

The sizes of the surrounding vehicles 30 and 50, the distances between the own vehicle 10 and the surrounding vehicles 30 and 50, and the relative speeds of the surrounding vehicles 30 and 50 to the own vehicle 10 may be calculated based on information detected by each of the front camera 110, the LiDAR 120, the front/rear RADAR 130, and the rear lateral RADAR 140. That is, each of the front camera 110, the LiDAR 120, the front/rear RADAR 130, and the rear lateral RADAR 140 may sense the first vehicle 30 and/or the second vehicle 50. However, in order to increase reliability of the information, information on the surrounding vehicles 30 and 50 may be calculated by combining the information measured by the front camera 110, the LiDAR 120, the front/rear RADAR 130, and the rear lateral RADAR 140.

The yaw rate sensor 150 may sense a speed at which a rotation angle (yaw angle) is varied around a vertical line passing through a center of the own vehicle 10. For example, the yaw rate sensor 150 may sense a variation in lateral behavior of the own vehicle 10 due to a side wind.

The lateral acceleration sensor 160 may sense acceleration of the own vehicle 10, which is varied toward a lateral direction. For example, the lateral acceleration sensor 160 may sense a variation in lateral behavior of the own vehicle 10 due to a side wind.

The steering angle sensor 170 may sense a variation in steering of the own vehicle 10. Specifically, the steering angle sensor 170 may sense a steering angular velocity value of the own vehicle 10. The steering angle sensor 170 sensing the variation in steering of the own vehicle 10 may mean that a driver has a steering intention of the own vehicle 10. That is, the steering angle sensor 170 may check a driver's intention of steering of the own vehicle 10.

The wheel speed sensor 180 may detect a variation in vehicle speed of the own vehicle 10 in a longitudinal direction. The wheel speed sensor 180 sensing the variation in vehicle speed in the longitudinal direction may mean that the driver of the own vehicle 10 has an intent for acceleration or deceleration. That is, the wheel speed sensor 180 may check an acceleration or deceleration intent of the driver of the own vehicle 10.

The first determinator 210 may determine a degree of influence of a side wind on the own vehicle 10 based on the information sensed by the sensor part 100. Specifically, the first determinator 210 may determine the degree of influence of the side wind, which is generated by the surrounding vehicles 30 and 50, on the own vehicle 10 based on the information sensed by the first sensor. When the first determinator 210 determines that the own vehicle 10 is affected by the side wind based on the information sensed by the first sensor, the second determinator 230 may determine whether a variation in behavior of the own vehicle 10 due to the side wind occurs based on the information sensed by the second sensor. That is, the first determinator 210 determines the degree of influence of the side wind so that it may prevent in advance that control is unnecessarily performed even when the own vehicle 10 is not affected by the side wind.

For example, the first determinator 210 may determine the sizes of the surrounding vehicles 30 and 50, the distances between the own vehicle 10 and the surrounding vehicles 30 and 50, and the relative speeds of the surrounding vehicles 30 and 50 to the own vehicle 10 through the first sensor, thereby determining the degree of influence of the side wind, which is expected to occur due to the surrounding vehicles 30 and 50. For example, as the sizes of the surrounding vehicles 30 and 50 become larger, influence of a side wind on the own vehicle 10 may become larger. For example, as the distances between the own vehicle 10 and the surrounding vehicles 30 and 50 become closer, influence of a side wind on the own vehicle 10 may become larger. For example, as the relative speeds of the surrounding vehicles 30 and 50 to the own vehicle 10 become larger, influence of a side wind on the own vehicle 10 may become larger. However, when the relative speeds of the surrounding vehicles 30 and 50 to the own vehicle 10 are extremely small even when the sizes of the surrounding vehicles 30 and 50 are large, the influence of the side wind on the own vehicle 10 may be negligible. Therefore, when the sizes of the surrounding vehicles 30 and 50 are greater than or equal to a predetermined size threshold, the distances between the own vehicle 10 and the surrounding vehicles 30 and 50 are less than a predetermined distance threshold, and absolute values of the relative speeds of the surrounding vehicles 30 and 50 to the own vehicle 10 are greater than or equal to a predetermined vehicle speed threshold, the first determinator 210 may determine that the own vehicle 10 is affected by a side wind. In order to determine a degree of influence due to a side wind, the first determinator 210 discriminates the degree of influence of the side wind on the basis that how different the information sensed by the first sensor is from the predetermined size threshold, the predetermined distance threshold, and the predetermined vehicle speed threshold. Alternatively, in order to determine a degree of influence due to a side wind, each of the predetermined size threshold, the predetermined distance threshold, and the predetermined vehicle speed threshold may be set as a plurality of numerical values to have a plurality of ranges, and the first determinator 210 may determine the degree of influence due to the side wind on the basis that the information sensed by the first sensor belongs to which range.

Further, the first determinator 210 may quantify the degree of influence of the side wind. The first determinator 210 may quantify the degree of influence of the side wind based on the sizes of the surrounding vehicles 30 and 50, the distances between the own vehicle 10 and the surrounding vehicles 30 and 50, and the relative speeds of the surrounding vehicles 30 and 50 to the own vehicle 10, and an equation for calculating the degree of influence of the side wind is as follows:

$$\text{Degree of influence of side wind} = \frac{|\text{relative speed of other vehicle}|^2 \times \text{size of other vehicle}}{\text{distance between own vehicle and other vehicle}}.$$

The term "other vehicle" in the above equation refers to a surrounding vehicle 30 or 50 of the own vehicle 10.

The second determinator 230 may determine a variation in lateral behavior of the own vehicle 10 based on the information sensed by the sensor part 100. Specifically, the second determinator 230 may determine whether a variation in behavior of the own vehicle 10 due to a side wind occurs based on the information sensed by the second sensor.

For example, the second determinator 230 may determine a driver's intention of steering of the own vehicle 10 and whether a behavior of the own vehicle 10 occurs in the lateral direction based on the information sensed by the second sensor. The front camera 110 may determine a degree of behavior of the own vehicle 10 in the lateral direction by checking a position of the own vehicle 10 based on a lane in which the own vehicle 10 is driving and detect whether the own vehicle 10 leaves the lane. In order to accurately determine the driver's intention of steering and the degree of the behavior of the own vehicle 10 in the lateral direction, the second determinator 230 may analyze the information sensed by the second sensor.

Further, the first determinator 210 may predict an occurrence time of a side wind based on the distances between the own vehicle 10 and the surrounding vehicles 30 and 50 and the relative speeds of the surrounding vehicles 30 and 50 to the own vehicle 10, which are sensed by the sensor part 100. Specifically, the first determinator 210 may predict a time when the own vehicle 10 will be affected by a side wind occurring by the surrounding vehicles 30 and 50 in advance.

When the variation in behavior of the own vehicle 10 in the lateral direction is checked through the front camera 110 and the steering angular velocity value sensed by the steering angle sensor 170 is less than or equal to the predetermined reference value, the second determinator 230 may determine that the driver has no intention of steering. In this case, the second determinator 230 may determine whether a value, which is measured by at least one sensor of the yaw rate sensor 150 and the lateral acceleration sensor 160, exceeds a predetermined setting value. The predetermined setting value may mean a setting value of a yaw rate value or a lateral acceleration value. Specifically, the yaw rate setting value and the lateral acceleration setting value may mean degree values which are determined that an abrupt variation in steering is present. However, the predetermined setting value may be a numerical value which may be changed by a designer. When the variation in behavior of the own vehicle 10 in the lateral direction is checked and no driver's intention of steering is determined through the steering angle sensor 170, the second determinator 230 may determine that an abnormal behavior occurs in the own vehicle 10. Further, when a value measured through at least one sensor of the yaw rate sensor 150 and the lateral acceleration sensor 160 exceeds the predetermined setting value, the second determinator 230 may determine that a behavior of the own vehicle 10 in the lateral direction is varied in spite of no driver's intention of steering. When a phenomenon in which the own vehicle 10 leaves a lane or is significantly pulled to one side in the lane is not sensed through the front camera 110, the own vehicle 10 may be determined as that a behavior in the lateral direction due to a side wind does not occur. The steering angular velocity value, which is sensed by the steering angle sensor 170, being less than or equal to a predetermined reference value may be construed that a steering is not changed by the driver and may mean that the driver has no intention of steering. In this case, the predetermined reference value may generally mean a degree of fine movement of a steering wheel according to a road surface or other environmental reasons in spite of the driver having no intention of steering. Further, the value, which is measured by the yaw rate sensor 150 or the lateral acceleration sensor 160, not exceeding the predetermined setting value may be construed that the behavior in the lateral does not excessively occur. Thus, the second determinator 230 may determine the driver's intention of steering and a variation in behavior of the own vehicle 10 in the lateral direction based on the information sensed by the front camera 110, the yaw rate sensor 150, the lateral acceleration sensor 160, and the steering angle sensor 170.

The first controller 310 and the second controller 330 may control vehicle control systems 410, 430, 450, and 470 based on a degree of influence of a side wind on the own vehicle 10 and a variance in behavior of the own vehicle 10 in the lateral direction. The first controller 310 may perform semi-active chassis system control which controls a driving mode of the own vehicle 10 based on a degree of influence of a side wind, and active chassis system control which controls steering and/or braking of the own vehicle 10 based on a variation in behavior of the own vehicle 10 in the lateral direction. The first controller 310 and the second controller 330 may perform the active chassis system control following the semi-active chassis system control or may simultaneously perform the semi-active chassis system control and the active chassis system control. Preferably, the first controller 310 and the second controller 330 may not perform the semi-active chassis system control in a state of not performing the active chassis system control.

The semi-active chassis system control may mean that the first controller 310 performs control of at least one of a semi-active suspension system (electronic controlled suspension (ECS) system) 410 and a motor-driven power steering (MDPS) system 430. The active chassis system control may mean that the second controller 330 performs control of at least one control of a rear wheel steering (RWS) system 450 and an electronic stability control (ESC) system 470. When the first determinator 210 determines that the own vehicle 10 is affected by a side wind, the first controller 310 may preferentially perform the semi-active chassis system control, and, when the second determinator 230 determines that the behavior of the own vehicle 10 in the lateral direction exceeds a predetermined behavior amount, the second controller 330 may additionally perform the active chassis system control. When the behavior of the own vehicle 10 in the lateral direction exceeds the predetermined behavior amount, the second controller 330 may preferentially perform steering control of the own vehicle 10 through the RWS system 450. The second controller 330 may additionally perform partial braking of the own vehicle 10 through the ESC system 470 based on a degree of behavior of the own vehicle 10. The second controller 330 may perform the active chassis system control based on the occurrence time of the side wind which is predicted by the first determinator 210. That is, the second controller 330 may perform the active chassis system control according to a time when the own vehicle 10 is affected by the side wind. Thus, it is possible to prevent unnecessary control of the own vehicle 10 from being performed at a time when the own vehicle 10 is not affected by the side wind.

For example, when the first determinator 210 determines that the own vehicle 10 is affected by the side wind, the first controller 310 may change the driving mode of the own vehicle 10 by controlling at least one of the semi-active suspension system 410 and the MDPS system 430. For example, when the first determinator 210 determines that the own vehicle 10 will be affected by the side wind, the first controller 310 may control the semi-active suspension system 410 to change a damping force of a suspension of the own vehicle 10 to become larger than normal (e.g., before activating the semi-active suspension system 410) and control the MDPS system 430 to change a steering mode to a sport mode. That is, the MDPS system 430 may adjust a handle of a steering wheel of the own vehicle 10 to become heavier than normal (e.g., before changing the steering mode to the sport mode). When strength of the suspension of the own vehicle 10 is changed to be larger than normal or the steering mode is changed to the sport mode, the own vehicle 10 becomes more stable while driving. Thus, the first controller 310 may control the semi-active suspension system 410 and the MDPS system 430 so as to prevent the own vehicle 10 from being affected by the side wind.

For example, the second controller 330 may control steering and/or braking of the own vehicle 10 based on the variance in behavior of the own vehicle 10 in the lateral direction. The steering and the braking may be controlled by the RWS system 450 and the ESC system 470. In order to determine a degree of control of the RWS system 450 and the ESC system 470, the second determinator 230 may calculate the variance in behavior of the own vehicle 10 in the lateral direction. The second determinator 230 may predict a target yaw rate value of the own vehicle 10 based on the information sensed by the lateral acceleration sensor 160, the steering angle sensor 170, and the wheel speed sensor 180. Specifically, the second determinator 230 may calculate a steering angle, a wheel speed signal, and a rear wheel lead screw stroke sensor value using a rear wheel steering angle and calculate a target yaw rate using the steering angle, the wheel speed signal, and the rear wheel lead screw stroke sensor value. A maximum value of the calculated target yaw rate may be limited by reflecting an estimated value of a road surface friction coefficient. The second determinator 230 may calculate a final target yaw rate which may be actually generated on a corresponding road surface on which the own vehicle 10 is driving. The yaw rate sensor 150 may sense an actual yaw rate value of the own vehicle 10, and the second determinator 230 may calculate a control value for stabilizing the behavior of the own vehicle 10 by comparing a final target yaw rate value with the actual yaw rate value. In this case, when the control value is large, the degree of behavior of the own vehicle 10 in the lateral direction may be determined as being large, and stability of the behavior of the own vehicle 10 may be determined as being low.

Further, in order to implement the control value, the second determinator 230 may calculate ranges of a limit braking force of each wheel and a producible lateral force of the own vehicle 10. That is, in order to secure the stability of the behavior of the own vehicle 10, the second determinator 230 may calculate a control value for correcting a difference between the target yaw rate value and the actual yaw rate value. In order to compensate for the control value, the second determinator 230 may calculate how much braking force and/or steering change of the own vehicle 10 is required. When the control value is determined as being implementable by a lateral force generated through the RWS system 450 of the own vehicle 10, the second controller 330 may control only the RWS system 450. However, when the control value is not implementable by only the lateral force generated through the RWS system 450 of the own vehicle 10, the second controller 330 may control both the RWS system 450 and the ESC system 470. In this case, the RWS system 450 may change a steering direction of the own vehicle 10, and the ESC system 470 may perform partial braking. That is, in order to move the own vehicle 10, which is driving in one direction due to influence of the side wind, in a direction opposite the one direction, the second controller 330 may control the RWS system 450 and the ESC system 470. The second controller 330 may change the steering of the own vehicle 10 in the direction opposite the one direction using the RWS system 450 and perform the partial braking through the ESC system 470 to change the one direction in which the own vehicle 10 is driving to the direction opposite the one direction.

According to an exemplary embodiment of the present disclosure, the integrated chassis control system 1 may perform control of moving the own vehicle 10 in a direction opposite a direction in which the own vehicle 10 is driving due to a side wind by checking a degree of influence of the side wind on the own vehicle 10 and a degree of behavior of the own vehicle 10 in the lateral direction due to the side wind. When the own vehicle 10 is affected by the side wind even though the driving mode of the own vehicle 10 is changed, the integrated chassis control system 1 may prevent a vehicle deviation and a vehicle accident through a direct steering change and braking of the own vehicle 10.

According to the embodiment of the present disclosure, the integrated chassis control system 1 may derive the degree of behavior of the own vehicle 10 in the lateral direction due to the side wind from the yaw rate value, thereby preventing many control from unnecessarily performed on the own vehicle 10. Further, force control (a steering change and braking) may be performed on the own vehicle 10 as necessary.

Figure 5:
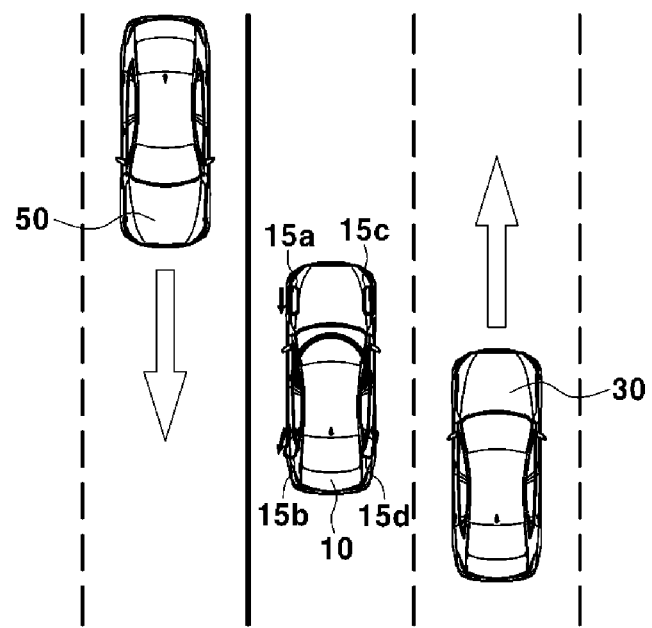
FIG. 5 is a diagram for describing a step-by-step control strategy for another own vehicle according to an exemplary embodiment of the present disclosure.

FIG. 4 is a diagram showing a control strategy of an own vehicle according to a degree of influence of a side wind according to an exemplary embodiment of the present disclosure, and FIG. 5 is a diagram for describing a step-by-step control strategy for another own vehicle according to an exemplary embodiment of the present disclosure. In FIG. 5, the first vehicle 30 is a vehicle which is driving in a right lane based on the own vehicle 10, and the second vehicle 50 is a vehicle which is driving in a left lane based on the own vehicle 10.

Referring to FIGS. 2 to 5, the own vehicle 10 may be affected by a side wind which occurs due to the second vehicle 50 which is driving a lane adjacent to the own vehicle 10. A behavior of the own vehicle 10 may be varied in one direction due to the side wind to collide with the first vehicle 30. Accordingly, a control part 310, 330 may perform the semi-active chassis system control (preemptive control) which changes a driving mode of the own vehicle 10 such that the behavior of the own vehicle 10 is not varied in one direction and/or the active chassis system control (a steering change, braking, and feedback control) which forcibly controls the own vehicle 10.

First, the first determinator 210 may determine whether stability of the behavior of the own vehicle 10 may be secured with only the semi-active chassis system control by determining the degree of influence of the side wind. The first sensor may sense the second vehicle 50 which is a vehicle causing the side wind, and sensed information may be analyzed by the first determinator 210. The first determinator 210 may classify the degree of influence of the side wind into three levels based on the information sensed by the first sensor. For example, the three levels may be classified into "Low," "Middle," and "High." The first determinator 210 may quantify the degree of influence of the side wind. The first determinator 210 may quantify the degree of influence of the side wind based on the sizes of the surrounding vehicles 30 and 50, the distances between the own vehicle 10 and the surrounding vehicles 30 and 50, and the relative speeds of the surrounding vehicles 30 and 50 to the own vehicle 10, and an equation for calculating the degree of influence of the side wind is as follows:

$$\text{Degree of influence of side wind} = \frac{|\text{relative speed of other vehicle}|^2 \times \text{size of other vehicle}}{\text{distance between own vehicle and other vehicle}}.$$

When the size of the other vehicle 50 exceeds a predetermined size threshold, the distance between the own vehicle 10 and the other vehicle 50 exceeds a predetermined distance threshold, and an absolute value of the relative speed of the other vehicle 50 to the own vehicle 10 exceeds a predetermined vehicle speed threshold, the first determinator 210 may determine that the degree of influence of the side wind is over "Low." In this case, when the degree of influence of the side wind is over "Low," the first controller 310 may perform the semi-active chassis system control. That is, the first controller 310 may control the ECS system 410 and the MDPS system 430 to change strength of the suspension of the own vehicle 10 and the driving mode thereof. For example, the first controller 310 may control the ECS system 410 to change the driving mode of the own vehicle 10 to a "Sport" mode and control the MDPS system 430 to change the strength of the suspension of the own vehicle 10 to be "Hard." When the degree of influence of the side wind is "Low," a variation in behavior of the own vehicle 10 in the lateral direction may not occur. Thus, when the degree of influence of the side wind is "Low," the second controller 330 may not perform the active chassis system control.

When the degree of influence of the side wind is "Middle" or "High," the second controller 330 may additionally perform the active chassis system control. That is, when the second determinator 230 determines that the behavior of the own vehicle 10 in the lateral direction exceeds a predetermined behavior amount, the second controller 330 may additionally perform the active chassis system control. The predetermined behavior amount may be a value which is predetermined by the designer and may mean more than a natural behavior amount in the lateral direction, which may occur due to a road surface or another environmental factor. When the degree of influence of the side wind is "Middle" or "High," a variation in behavior of the own vehicle 10 in the lateral direction may occur. The second determinator 230 may compare an actual yaw rate value obtained through the yaw rate sensor 150 with a target yaw rate value which is predicted based on the information sensed by the lateral acceleration sensor 160, the steering angle sensor 170, and the wheel speed sensor 180 to calculate a control value for stabilizing the behavior of the own vehicle 10.

When the control value is determined as being compensatable for due to generation of a lateral force by the RWS system 450, the second controller 330 may control only the RWS system 450. However, when the control value is not compensatable for with the lateral force by the RWS system 450, the second controller 330 may control both the RWS system 450 and the ESC system 470.

When the behavior of the own vehicle 10 in the lateral direction exceeds the predetermined behavior amount, the second controller 330 may preferentially perform steering control of the own vehicle 10 through the RWS system 450. When the degree of lateral behavior is severe, the second controller 330 may additionally perform control of the ESC system 470.

For example, when the first determinator 210 determines that the degree of influence of the side wind is "Middle," the first controller 330 may control the RWS system 450 to change the steering of the own vehicle 10. Owing to the side wind occurring by the second vehicle 50, a phenomenon in which the own vehicle 10 is pulled to a right side may occur. Since the own vehicle 10 may collide with the first vehicle 30 due to the phenomenon in which the own vehicle 10 is pulled to the right side, the second controller 330 may control the RWS system 450 so as to change the steering of the own vehicle 10 to a left side. Specifically, the second controller 330 may control a second wheel 15b and a fourth wheel 15d to change a driving direction of the own vehicle 10.

For example, when the first determinator 210 determines that the degree of influence of the side wind is "High," the second controller 330 may control the ESC system 470 to perform partial braking on the own vehicle 10. The partial braking may mean to perform braking control of a wheel in a direction opposite a direction in which a risk of a vehicle collision is present. That is, since the own vehicle 10 is in danger of colliding with the first vehicle 30, the second controller 330 may perform braking on a first wheel 15a and the second wheel 15b of the own vehicle 10, and, owing to the braking of the first wheel 15a and the second wheel 15b, the driving direction of the own vehicle 10 may be changed to a left direction.

Figure 6:
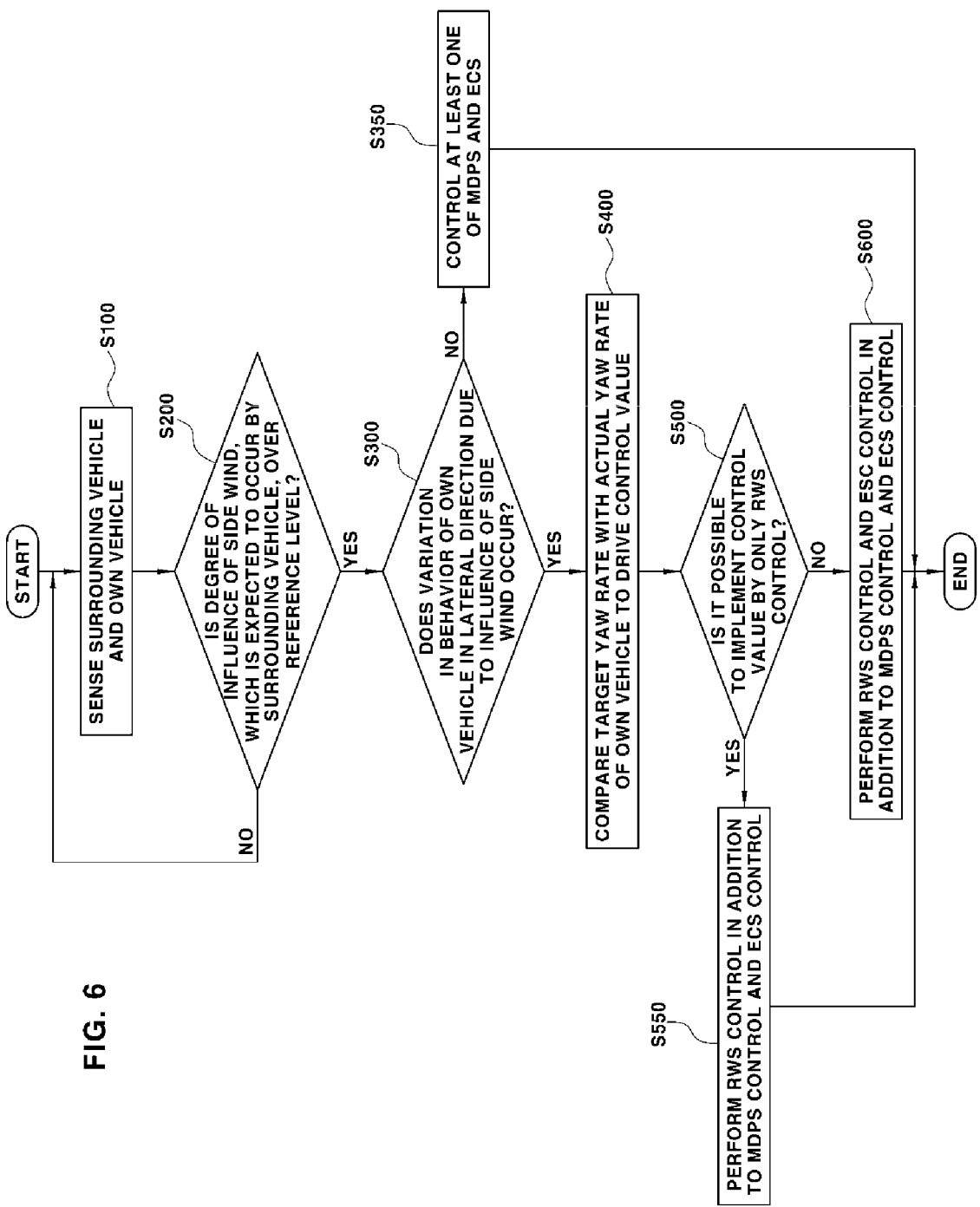
FIG. 6 is a flowchart illustrating a method of preventing a lane departure due to a side wind according to an exemplary embodiment of the present disclosure.

FIG. 6 is a flowchart illustrating a method of preventing a lane departure due to a side wind according to an exemplary embodiment of the present disclosure.

Referring to FIG. 6, a sensor part may sense an own vehicle and a surrounding vehicle. In this case, the surrounding vehicle may mean a vehicle which generating a side wind affecting the own vehicle. The sensor part may include a first sensor and a second sensor. The first sensor may sense a size of the surrounding vehicle, a distance between the own vehicle and the surrounding vehicle, and a relative speed of the surrounding vehicle to the own vehicle, and the second sensor may sense a steering angle of the own vehicle, a yaw rate value thereof, a lateral acceleration value thereof, and a lane in front of the own vehicle (S100).

A first determinator may determine whether a side wind occurs by the surrounding vehicle and whether the own vehicle will be affected due to the side wind which occurs by the surrounding vehicle. The first determinator may determine whether a degree of influence of the side wind, which is expected to occur due to surrounding vehicle, is greater than or equal to a reference level. In this case, the reference level may mean that the degree of influence of the side wind is over "Low." The first determinator may determine the degree of influence of the side wind based on information sensed by the first sensor. The first determinator may determine the degree of influence of the side wind on the basis whether each of the size of the surrounding vehicle, the distance between the own vehicle and the surrounding vehicle, and the relative speed of the surrounding vehicle to the own vehicle exceed a predetermined setting value. Further, the first determinator may quantify the degree of influence of the side wind based on the size of the surrounding vehicle, the distance between the own vehicle and the surrounding vehicle, and the relative speed of the surrounding vehicle to the own vehicle. When the own vehicle is determined as not being affected by the side wind occurring by the surrounding vehicle, a first controller and a second controller may not perform separate control. The sensor part may sense the own vehicle and the surrounding vehicle in real time regardless of whether the first controller and the second controller control the own vehicle (S200).

When the own vehicle is determined as being affected by the side wind occurring by the surrounding vehicle, the second determinator may determine whether a variation in behavior of the own vehicle in the lateral direction occurs due to influence of the side wind. Whether the variation in behavior of the own vehicle in the lateral direction occurs may be determined by a front camera. Further, when a value measured by at least one of a yaw rate sensor and a lateral acceleration sensor exceeds a predetermined setting value, the second determinator may determine that the behavior of the own vehicle in the lateral direction is varied. In this case, when the variation in behavior of the own vehicle in the lateral direction is checked and a steering angular velocity value sensed through a steering angle sensor is less than or equal to a predetermined reference value, the second determinator may determine that no driver's intention of steering is present but an abnormal behavior occurs in the own vehicle due to the side wind (S300).

When the second determinator determines that the behavior of the own vehicle in the lateral direction is not varied, the first controller may perform semi-active chassis system control for controlling an MDPS system and ECS system. A controller may change a driving mode of the own vehicle through the semi-active chassis system control to minimize the influence due to the side wind (S350).

When the second determinator determines that the behavior of the own vehicle in the lateral direction is varied, the second determinator may calculate how much a variation in behavior of the own vehicle occurs. Unlike the above-described example, a variance in behavior of the own vehicle in the lateral direction may be calculated in the second controller. Specifically, the second determinator may calculate a target yaw rate and an actual yaw rate of the own vehicle to derive a control value, and the second controller may perform the active chassis system control according to the derived control value. In this case, the semi-active chassis system control may be basically performed (S400).

When the control value is a value which is compensatable for by means of only control of the RWS system, the second controller may control only the RWS system to forcibly change the steering of the own vehicle. That is, in addition to the semi-active chassis system control which is conventionally performed by the first controller, the second controller may perform steering control of the own vehicle to change the steering of the own vehicle in a direction opposite a direction in which a collision is sensed based on the own vehicle (S500 and S550).

When the control value is a value which is not compensatable for by means of only the control of the RWS system, the second controller may control both the RWS system and the ESC system to change the steering of the own vehicle and perform partial braking on the own vehicle. That is, in addition to the semi-active chassis system control which is conventionally performed by the first controller, the second controller may perform control of the RWS system and the ESC system to change the steering of the own vehicle in a direction opposite the direction in which the collision is sensed based on the own vehicle and perform partial braking on the own vehicle. The partial braking may be performed on a wheel of the own vehicle disposed in a direction opposite the direction in which the collision is sensed based on the own vehicle so that the steering of the own vehicle may be changed in the direction opposite the direction in which the collision is sensed based on the own vehicle (S500 and S600).

In accordance with the embodiments of the present disclosure, an integrated chassis control system can perform control of moving an own vehicle in a direction opposite a direction in which the own vehicle is driving due to a side wind by checking a degree of influence of the side wind on the own vehicle and a degree of behavior of the own vehicle in a lateral direction due to the side wind. When the own vehicle is affected by the side wind even though a driving mode of the own vehicle is changed, the integrated chassis control system can prevent a vehicle deviation and a vehicle accident through a direct steering change and braking of the own vehicle.

In accordance with the embodiments of the present disclosure, the integrated chassis control system can derive the degree of behavior of the own vehicle in the lateral direction due to the side wind from a yaw rate value, thereby preventing many control from unnecessarily performed on the own vehicle. Further, force control (a steering change and braking) may be performed on the own vehicle as necessary.

Although the embodiments of the present disclosure have been described in detail, the scope of the prevent disclosure is not limited to these embodiments, and various modifications and improvements devised by those skilled in the art using the fundamental concept of the present disclosure, which is defined by the appended claims, further fall within the scope of the present disclosure. Therefore, it should be understood that the above-described embodiments are not restrictive but illustrative in all aspects.

What is claimed is:

1. An integrated chassis control system comprising:
   a first sensor configured to sense a first vehicle driving in a lane adjacent to a lane in which an own vehicle is driving and to sense behavior information of the first vehicle;
   a second sensor configured to sense a variation in behavior of the own vehicle;
   a first determinator configured to determine a degree of influence of a side wind, which is predicted to occur due to the first vehicle, based on the behavior information of the first vehicle;
   a second determinator configured to determine a variance in abnormal behavior of the own vehicle based on information sensed by the second sensor;
   a first controller configured to perform a semi-active chassis system control, which controls a driving mode of the own vehicle, when the degree of influence of the side wind, which is predicted by the first determinator, is greater than or equal to a predetermined setting value; and
   a second controller configured to perform an active chassis system control by calculating a control value for stabilizing the behavior of the own vehicle according to the variance in abnormal behavior of the own vehicle which is determined by the second determinator,
   wherein the semi-active chassis system control includes control of a motor-driven power steering (MDPS) system and a semi-active suspension system (electronic controlled suspension (ECS) system) of the own vehicle,
   the active chassis system control includes control of a rear wheel steering (RWS) system and an electronic stability control (ESC) system of the own vehicle,
   when the second controller performs control of stabilizing the behavior of the own vehicle, the second controller first performs steering control of the own vehicle through the RWS system to generate lateral force, and
   when generation of additional lateral force is required so as to further stabilize the behavior of the own vehicle, the second controller additionally performs partial braking through the ESC system.

2. The integrated chassis control system of claim 1, wherein the first sensor includes at least one of a front camera, a front/rear radio detection and ranging (RADAR), a rear lateral RADAR, or a light detecting and ranging (LiDAR).

3. The integrated chassis control system of claim 2, wherein the first determinator determines a size of the first vehicle, a distance between the own vehicle and the first vehicle, and a relative speed of the first vehicle to the own vehicle through the first sensor.

4. The integrated chassis control system of claim 3, wherein:
   the first determinator quantifies the degree of influence of the side wind based on the size of the first vehicle, the distance between the own vehicle and the first vehicle, and the relative speed of the first vehicle to the own vehicle, and
   the degree of influence of the side wind is calculated as follows:

$$\text{Degree of influence of side wind} = \frac{|\text{relative speed of other vehicle}|^2 \times \text{size of other vehicle}}{\text{distance between own vehicle and other vehicle}}.$$

5. The integrated chassis control system of claim 1, wherein the second sensor includes at least one of a front camera, a yaw rate sensor, a lateral acceleration sensor, a steering angle sensor, or a wheel speed sensor.

6. The integrated chassis control system of claim 1, wherein the second determinator:
   predicts a target yaw rate value of the own vehicle based on information sensed by a steering angle sensor and a wheel speed sensor, and
   compares an actual yaw rate value, which is measured by a yaw rate sensor, with the target yaw rate value to determine the variance in abnormal behavior of the own vehicle.

7. The integrated chassis control system of claim 1, wherein the second determinator:
   determines a driver's intention of steering based on information sensed by a steering angle sensor, determines the variation in behavior of the own vehicle in a lateral direction based on information sensed by at least one of a front camera, a yaw rate sensor, or a lateral acceleration sensor, and determines the variance in abnormal behavior of the own vehicle.

8. The integrated chassis control system of claim 7, wherein:

when a steering angular velocity value, which is sensed by the steering angle sensor, is less than or equal to a reference value, the second determinator determines that no driver's intention of steering is present; and when the steering angular velocity value is less than or equal to the reference value and the second determinator determines that the variation in behavior of the own vehicle in the lateral direction is present, the second determinator determines that the behavior of the own vehicle is abnormal.

9. The integrated chassis control system of claim 1, wherein the MDPS system adjusts a steering wheel of the own vehicle to be heavier than normal, and the ECS system adjusts a damping force of a suspension to be larger than normal.

10. The integrated chassis control system of claim 1, wherein:

in order to implement the control value, the second determinator calculates ranges of a limit braking force of each wheel and a producible lateral force of the own vehicle, when the control value is implementable by generating a lateral force through the RWS system, the second controller controls only the RWS system, and when the control value is not implementable by generating the lateral force through the RWS system, the second controller controls both of the RWS system and the ESC system.

11. The integrated chassis control system of claim 1, wherein the first determinator predicts an occurrence time of the side wind based on a distance between the own vehicle and the first vehicle and a relative speed of the first vehicle to the own vehicle.

12. The integrated chassis control system of claim 11, wherein the first controller preferentially performs the semi-active chassis system control over the active chassis system control, and the second controller performs the active chassis system control based on the predicted occurrence time of the side wind.

* * * * *